United States Patent Office 2,967,164
Patented Jan. 3, 1961

2,967,164

PLASTICIZED POLYMERIZED HYDROCARBON-SUBSTITUTED ETHYLENES

Robert S. Aries, 270 Park Ave., New York, N.Y.

No Drawing. Filed Feb. 3, 1956, Ser. No. 563,197

7 Claims. (Cl. 260—23)

The present invention relates to plasticized polymers of hydrocarbon-substituted ethylenes. More particularly, it relates to the preparation of novel compositions of matter comprising crystallized polymers of one or more hydrocarbon-substituted ethylenes, i.e., alpha-beta unsaturated hydrocarbons containing at least three carbon atoms, and a plasticizer therefor of such compatibility that the resulting product is a homogeneous, uniform plastic material of superior properties and complete stability over a wide range of service conditions. Articles fabricated from the novel compositions exhibit a relatively high softening point and a very low brittle point with great resistance to flexing, tearing, bursting and impact together with excellent electrical behavior and with outstanding optical clarity.

Until now it has not been possible to plasticize polyhydrocarbons such as polyethylene, polypropylene or polystyrene in the same advantageous manner as that in which the technique of plasticization has been commercially used with polyvinylchloride and its copolymers or with cellulose derivatives such as the cellulose nitrates and cellulose acetates. Polyethylene, for example, can be softened with high boiling aromatic hydrocarbons but there is not sufficient molecular attraction between the polymer and the aromatic softening agent to produce a permanent bonding of the two components with each other. Apparently polyethylene is too densely packed and permits the molecules of the lower molecular weight plasticizer or softening material to enter the polyethylene structure only in a very inefficient manner so that neither the amorphous areas nor the crystalline domains are really penetrated. As a consequence it has not been possible to find a plasticizer for polyethylene which remains permanently attached to the polymer and does not diffuse out of it and evaporate within a relatively short period of time. Many attempts have been made to find suitable plasticizers for polystyrene but it has heretofore been found that any organic liquid which is compatible with the polymer softens its entire structure and acts as a solvent rather than as a plasticizer. Since there are no polar groups and no crystalline domains in polystyrene the addition of a low molecular weight organic liquid or solid softens the entire structure in such a manner that there is nothing left which can transfer stress and provide for the prevention of permanent flow. As a consequence plasticizers are not used in conjunction with polystyrene although its brittle point is high and its impact strength low. This difficulty in plasticizing polystyrene in the conventional manner has actually led to another method of improving its properties by blending it mechanically with soft polymeric materials such as natural rubber or the various types of synthetic rubber. However, this polyblending represents a relatively costly and difficult procedure and the resulting products are not entirely satisfactory particularly from the viewpoint of clarity and stability. Normally liquid plasticizers on the other hand are not sufficiently an-chored in the polymeric matrix, they separate out too easily and as a result crazing and brittleness occur.

I have now found that the crystalline or semi-crystalline types of polypropylene and polystyrene and other polyolefins behave entirely differently from the amorphous types and can be combined with low molecular weight plasticizers in a very efficient and advantageous manner. Polypropylenes, polystyrenes and other polymers of hydrocarbon-substituted ethylenes of this crystalline type were first prepared by G. Natta with the use of certain catalytically active systems similar to the catalysts which K. Ziegler had discovered for the low pressure polymerization of ethylene. In the course of my own work in this field I have found other, new types of catalytically active combinations which lead to partly crystalline polypropylenes and polystyrenes under even simpler conditions and with even superior properties.

These polymers has very high molecular weights and because of their more highly crystalline character have much higher softening points than the normal polypropylenes and polystyrenes hitherto known. However, at room temperature and below they are hard and even brittle and because of the relatively large size of the spherulitic crystalline domains they are also opaque or at least rapidly become opaque if the fibers, films or molded articles prepared from them are cooled down to room temperature. In the course of extensive experiments I have found that low molecular weight plasticizers can be incorporated into crystalline polypropylene, polystyrene and other polyolefins in such a manner that transparent, tough and flexible products result which do not show any permanent flow below their melting points and do not permit the diffusing out of the plasticizers from the semi-crystalline polymeric matrix. Depending on the amount and nature of the plasticizer used the brittle point of the composition can be reduced to very low temperatures while the softening point is maintained at a sufficiently high level. At the same time completely transparent materials are obtained with excellent electrical, optical and mechanical properties.

This is especially surprising since polyethylene of the same general crystalline structure and prepared in the same manner has not been capable of being plasticized in the same manner. This difference in the behavior of polyethylene and polymers of hydrocarbon-substituted ethylenes is believed due to the close packing of the ethylene polymer chains which does not permit the crystalline areas to be attacked by the plasticizer. In contrast therewith, apparently the polymer chains in the crystalline areas of polymerized hydrocarbon-substituted ethylenes are sufficiently spaced to permit access of certain plasticizers.

Polymers of hydrocarbon-substituted ethylenes which may be plasticized in accordance with the present invention include the alkyl, aryl, alkaryl and aralkyl substituted ethylenes, particularly lower alkyl substituted ethylenes such as propylene, butylene, and the like, and styrene, benzyl-ethylene, methylphenyl-ethylene, and the like, i.e., alpha-beta unsaturated hydrocarbons containing at least three carbon atoms.

Suitable plasticizers therefor include high boiling, non-volatile mono- and polycyclic aromatic hydrocarbons, halogenated derivatives thereof, and esters of higher aliphatic alcohols. The aromatic nucleus may comprise benzene, naphthalene, biphenyl, diphenylmethane, anthracene, phenanthrene, and the like. The boiling point of the plasticizer should be at least 200° C. and preferably at least 250° C. and its vapor pressure at room temperature should not exceed about $10^{-3}$ mm. Hg. Consequently, where the aromatic nucleus is monocyclic or bicyclic the plasticizer molecule should include at least one lower alkyl radical or halogen atom in order to decrease the volatility below the indicated levels. Where esters are employed, representative alcohols include lauryl alcohol, decyl alcohol, octyl alcohol, and the like, esterified with inorganic acids such as phosphoric acid, higher aliphatic acids such as sebacic acid, stearic acid, and the like, and cycloaliphatic acids such as the naphthenic and rosin acids. Representative plasticizers include diamylbiphenyl, mono-amyl-chloronaphthalene, hexachlorobiphenyl, polyamyl-naphthalene and mixtures thereof with polyamyl-anthracene, trioctyl phosphate, dilauryl sebacate, and decyl stearate. The plasticizers may be incorporated into the polymers in an amount ranging between about 1% and 200% by weight although they are preferably employed in an amount ranging between about 5% and 30% by weight of the polymer.

It has already been found by Ziegler that his catalysts permit the preparation of polyethylenes with number average molecular weights up to and above 100,000 and I have found that my own new catalysts permit not only the production of high molecular weight polyethylenes but also of polypropylenes, polystyrenes and other polyvinyl compounds with a high number average molecular weight.

Polypropylenes of this type which I have prepared had intrinsic viscosities (measured in xylene at 75° C.) between 3.5 and 4.6, and melt viscosities (measured at 165° C.) of $5 \times 10^7$ poises. They are extremely tough and difficult to mold, blow, cast, spin and extrude, although the final samples made from them have exceedingly high mechanical strength. However, if a certain amount of a compatible plasticizer is incorporated into these high molecular weight polypropylenes it is possible to reduce the melt viscosity to any necessary and desirable degree so that the resulting composition combines in a very favorable and hitherto unknown manner superior mechanical properties and ease of processing. The plasticizer can be blended into the polymer on rolls, in a dough mixer or in a ball mill; it can also be added to a solution of the polymer if it is desired to spin, cast or extrude in the presence of a solvent. The incorporation of the plasticizer can take place at ambient temperature or at elevated temperatures in the presence or absence of pigments, stabilizers and compatibilizers. Depending on the amount and the nature of the plasticizer the brittle points of the new compositions containing polypropylene range from −10° C. down to −65° C., and the softening points from 160° C. down to 80° C.

I have also prepared with my new catalytically active systems crystalline polystyrenes of very high molecular weight. These materials had intrinsic viscosities between 4.6 and 6.2, and melt viscosities above $10^7$ poises. Although their mechanical strength was outstanding they were so difficult to process that their commercial value was rather limited. Here again my invention leads to new compositions of matter by incorporating ordinary plasticizers into microcrystalline, high molecular weight polystyrenes. The blending can be carried out in any of the technically known ways, such as calendering, milling, rolling, kneading or codissolving in a common solvent. Depending on the amount and nature of the plasticizer these new compositions show brittle temperatures down to −30° C. and softening points ranging from 210° C. down to 80° C. They are extremely tough, resilient and flexible and do not permit the diffusing out of the plasticizer from the polymeric matrix.

The following examples illustrate the preparation of novel compositions in accordance with the present invention:

*Example 1*

(a) 2.4 grams of $TiCl_2$ were suspended in 50 ml. of octane and 0.2 gram of triisobutyl aluminum in 5 ml. of octane was added while stirring in a nitrogen-blanketed 3-necked reaction flask. The temperature was brought to 50° C. and propylene was bubbled through the solution. After a short induction period a white haze began to form in the flask and the contents became progressively thicker until after 6 hours no more propylene seemed to be absorbed. The charge in the flask was a dark heavy mass which slowed up the stirrer. The charge was placed on to a Büchner funnel and washed exhaustively with aqueous HCl, then with water and finally with methanol until the filtrate was free of chlorides. The product was dried at 50° C. in a vacuum oven. There were obtained 13 grams of a snow-white, fluffy, light powder soluble in hot aromatic and aliphatic hydrocarbons, insoluble in alcohol or ether. It is a polypropylene with the following characteristic properties:

| | |
|---|---|
| Density | 0.908 |
| Melting point _____° C_ _ | 151 |
| Intrinsic viscosity | 2.3 |

A small amount of this polypropylene powder was melted and cast on a glass plate in a thin layer. The resulting film was stretched to about 200% of its original length and became strongly birefringent. When the film was irradiated perpendicularly to its plane with a parallel X-ray beam the film produced a diffraction pattern consisting of a diffuse halo with a superimposed fiber diagram having an identity period of 6.45 Angstrom units parallel to the direction of the stretch. This pattern together with the above data for the properties indicates the material is semicrystalline polypropylene, i.e., isotactic according to G. Natta's classification.

(b) 10 grams of this material were put on a pair of stainless steel laboratory rolls and heated to 140° C. It was flattened out by the rolls into an opaque sheet of somewhat irregular thickness and marked non-uniformity. Then 3 ml. of diamyl-biphenyl (B.P. about 330° C.) were added as plasticizer to the mass on the calendering rolls and worked into the sheet. Within a few minutes the plasticizer was entirely taken up and a smooth, brilliantly transparent sheet was formed which was cut from the rolls and flattened out on a metal plate. After this sheet was cooled down to room temperature it was hard, flexible and transparent with a brittle point of approximately −30° C. and a flow point of approximately 125° C. The plasticizer was uniformly distributed throughout the material and did not diffuse out of it even at elevated temperatures for prolonged periods. A monochromatic X-ray diagram revealed only a diffuse diffraction halo with no superimposed fiber diagram indicating that this combination of isotactic polypropylene and diamyl-biphenyl represents a novel composition of matter exhibiting valuable mechanical, optical and electrical properties. A few characteristic properties determined for this composition were:

| | |
|---|---|
| Density | 0.906 |
| Brittle point _____° C_ _ | −28.6 |
| Flow point _____° C_ _ | 126.2 |
| Tensile strength at 25° C. _____p.s.i_ _ | 4860 |
| Flexural strength at 25° C. _____p.s.i_ _ | 5380 |
| Dielectric constant at $10^6$ cycles _____ | 2.56 |
| Power factor at $10^6$ cycles _____ | 0.00062 |

*Example 2*

(a) Polypropylene was prepared by the procedure of Example 1a using as the catalytically active system a mixture of 3.8 grams of titanium tetrachloride and 6.0 grams of zinc diethyl in heptane, the polymerization being effected at 65° C. The washed and dried polypropylene had the following characteristics:

| | |
|---|---|
| Density | 0.909 |
| Melting point _____° C_ _ | 155 |
| Intrinsic viscosity | 2.8 |

The X-ray identity period determined as in Example 1 was 6.48 Angstrom units.

(b) This polypropylene was plasticized with 25% of mono-amyl-chloronaphthalene on the stainless steel rolls, the product being transparent, tough, rigid but flexible and having the following characteristic properties:

| | |
|---|---|
| Density | 0.912 |
| Melting point | °C 138 |
| Brittle point | °C −32 |
| Flow point | °C 129.4 |
| Tensile strength at 25° C. | p.s.i 4950 |
| Flexural strength at 25° C. | p.s.i 5160 |
| Dielectric constant at $10^6$ cycles | 3.1 |
| Power factor at $10^6$ cycles | 0.0011 |

No crystallinity was found in this plasticized product.

Example 3

(a) Polypropylene was prepared as in Example 1a using as the catalytically active system a mixture of 2.4 grams of titanium dichloride and 0.1 gram of lithium ethyl in tetralin and the polymerization was carried out at 60° C. The washed and dried polypropylene had the following characteristics:

| | |
|---|---|
| Density | 0.901 |
| Melting point | °C 146 |
| Intrinsic viscosity | 2.2 |

The X-ray identity period determined as in Example 1b was 6.51 Angstrom units.

(b) 8 grams of this polymer were dissolved at 60° C. in 200 ml. of toluene and 2 grams of hexachlorobiphenyl were added to the solution and stirred to complete homogeneity. The mixture was poured onto a glass plate and the solvent was slowly evaporated. There remained after complete evaporation of the solvent a transparent, flexible, non-tacky film of high tear-strength. Some of its characteristic properties were:

| | |
|---|---|
| Density | 0.920 |
| Brittle point | °C −31 |
| Flow point | °C 133 |
| Dielectric constant at $10^6$ cycles | 4.2 |
| Power factor at $10^6$ cycles | 0.0039 |

The polypropylene-plasticizer composition showed no fiber diagram with X-rays but only a diffuse diffraction halo.

Example 4

(a) An approximately equimolar mixture of $Al_2O_3$, $Cr_2O_3$ and $SiO_2$ in the form of an extremely fine powder was reduced with excess sodium amalgam under a blanket of dry nitrogen. The reduced solids were skimmed off and placed in dry decane in a small stainless steel agitated autoclave blanketed with nitrogen. Then dry propylene was forced in with continuous agitation to a pressure of 10 atmospheres and the temperature was raised to 120° C. As the pressure fell due to absorption of propylene the pressure was restored every 2 hours to 10 atmospheres. At the end of 12 hours the pressure was released, the product was washed and dried as in Example 1a and found to have the following properties:

| | |
|---|---|
| Density | 0.901 |
| Intrinsic viscosity | 2.1 |

The X-ray identity period was 6.45 Angstrom units.

(b) The polymer was plasticized with 25% of trioctyl phosphate by mixing on the warm calendering rolls. The product was a transparent, tough, flexible sheet which had the following properties:

| | °C. |
|---|---|
| Brittle point | −38 |
| Flow point | 132 |

Example 5

(a) A catalytically active system was prepared as before from 3.8 grams of titanium tetrachloride and 4.5 grams of aluminum triethyl in heptane. Liquid styrene was added to the 3-necked flask, containing the catalyst under a blanket of dry, oxygen-free nitrogen with continuous stirring at 60° C.

The polystyrene had the following properties:

| | |
|---|---|
| Density | 1.11 |
| Brittle point | °C 76 |
| Flow point | °C 162 |
| Intensity period | Angstrom units 6.28 |

(b) Compounding the polystyrene with 15% by weight of polyamyl naphthalene (about 2.7 amyl radicals per naphthalene nucleus) gave a tough, transparent sheet material.

Example 6

(a) A catalytically active system was prepared as in Example 1a with 2.4 grams of titanium dichloride and 0.4 gram of ethyl magnesium bromide in dry octane under a nitrogen blanket. In a 3-necked flask provided with a stirrer and blanketed with nitrogen butylene-1 was introduced at 75° C. The resulting polybutylene was washed and dried as in Example 1a, exhibiting a softening point of 128° C.

(b) The polybutylene was plasticized with 15% by weight of Dutrex–25 (Shell Chemical Co.—aromatic extract of lubricating oils with higher aliphatic side chains, ASTM boiling range at 1 mm. of 266–423° F.).

As employed throughout the specification and claims, the term "higher" in connection with alcohols and acids has reference to a carbon chain of seven or more carbon atoms whereas "lower" has reference to a carbon chain of six or less carbon atoms.

Various changes and modifications may be made without departing from the spirit and scope of the present invention and it is intended that such obvious changes and modifications be embraced by the annexed claims.

What I claim is:

1. Composition of matter comprising a crystalline polymer of ethylene substituted by a member selected from the group consisting of alkyl, aryl, alkaryl and aralkyl radicals, said polymer being characterized by very high molecular weight, highly crystalline character, and high softening point, and from about 1% to about 200% by weight of a nonvolatile plasticizer having a boiling point in excess of about 200° C. which is selected from the group consisting of diamyl-biphenyl, mono-amyl-chloronaphthalene, hexachlorobiphenyl, polyamylnaphthalene, trioctyl phosphate, dilauryl sebacate, and decyl stearate.

2. The composition of claim 1 in which the amount of plasticizer is from about 5% to about 30% by weight.

3. A composition of matter comprising crystalline polypropylene, and from about 5% to about 30% by weight of trioctyl phosphate as plasticizer.

4. A composition of matter comprising crystalline polypropylene, and from about 5% to about 30% by weight of diamyl-biphenyl as plasticizer.

5. A composition of matter comprising crystalline polypropylene, and from about 5% to about 30% by weight of mono-amyl-chloronaphthalene as plasticizer.

6. A composition of matter comprising crystalline polypropylene, and from about 5% to about 30% by weight of hexachlorobiphenyl as plasticizer.

7. A composition of matter comprising crystalline polystyrene, and from about 5% to about 30% by weight of polyamyl naphthalene as plasticizer.

References Cited in the file of this patent

UNITED STATES PATENTS

| | | |
|---|---|---|
| 2,172,391 | Krase | Sept. 12, 1939 |
| 2,691,647 | Field et al. | Oct. 12, 1954 |
| 2,717,889 | Feller et al. | Sept. 13, 1955 |
| 2,726,231 | Field et al. | Dec. 6, 1955 |
| 2,728,757 | Field et al. | Dec. 27, 1955 |

(Other references on following page)

UNITED STATES PATENTS

| 2,731,452 | Field et al. | Jan. 17, 1956 |
| 2,824,090 | Edwards et al. | Feb. 18, 1958 |
| 2,833,755 | Coover | May 6, 1958 |

FOREIGN PATENTS

| 526,101 | Italy | Apr. 14, 1955 |
| 538,782 | Belgium | Dec. 6, 1955 |

OTHER REFERENCES

Hahn et al.: Polythene, Physical and Chem. Prop., pages 526–33, Ind. and Eng. Chem. 37, No. 6 (1945).

Richards: Polyethylene—Structure, Crystallinity and Prop., J. Appl. Chem., pages 370–76 (August 1, 1951).

Modern Plastics, pages 85–88, vol. 33, No. 1 (September 1955).

Raff et al.: Polyethylene, Interscience, 1956, pp. 299–302.

Schildknecht: Polymer Processes, Interscience, p. 680 (1956).